Nov. 10, 1936.   M. J. EBBERTS   2,060,004
BARBECUE APPARATUS
Filed Oct. 14, 1933
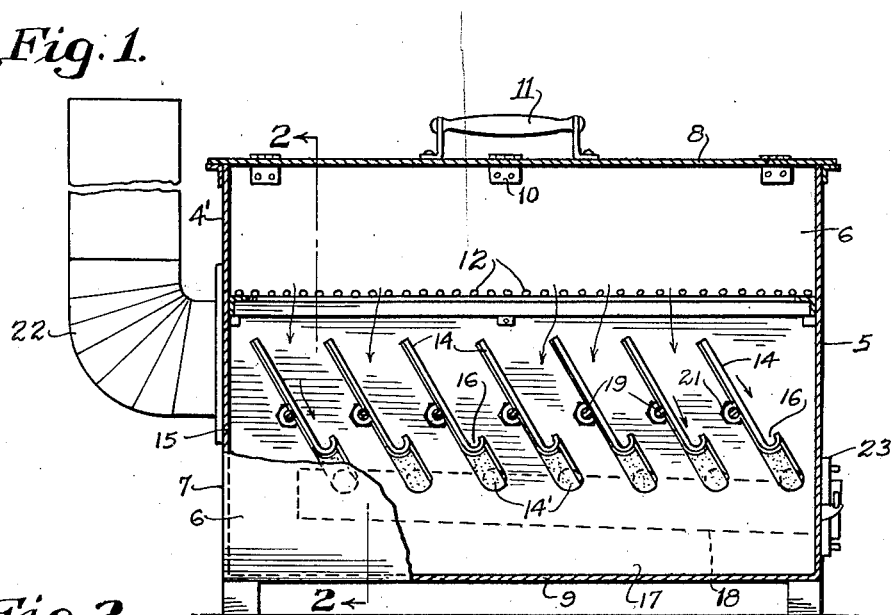
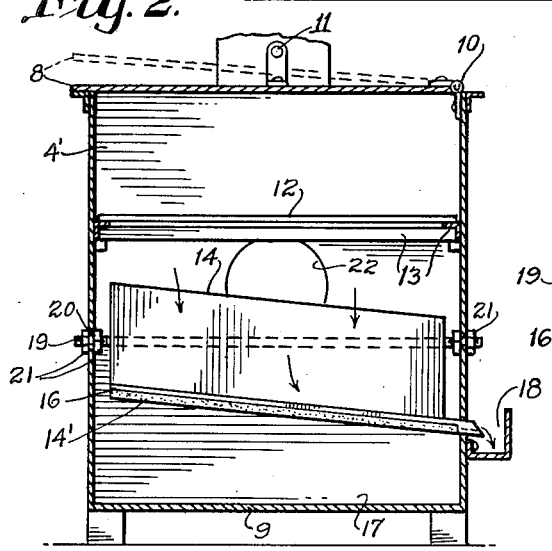
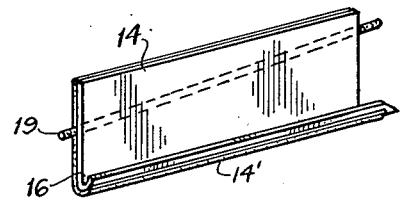
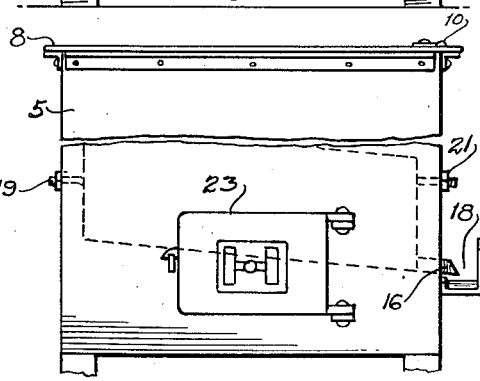
Inventor
MARTIN J. EBBERTS
By Mason Fenwick & Lawrence
Attorneys Patented Nov. 10, 1936

2,060,004

UNITED STATES PATENT OFFICE 2,060,004

BARBECUE APPARATUS

Martin J. Ebberts, Beaumont, Tex.

Application October 14, 1933, Serial No. 693,655

4 Claims. (Cl. 126—14)

This invention relates to improvements in barbecuing apparatus; and, more particularly, means for preserving the drippings from the cooking meats.

One of the principal problems in connection with the barbecuing of meats is the loss of the juices, including expensive barbecuing sauces, since in order to carry out the barbecue method of cooking, the same must be done over an open fire, the meats coming into direct contact with the source of heat. It follows that there can be no interference with the path of the heat, and for this reason the placing of any drip-catcher beneath the meats so as to form an obstruction would be highly objectionable. It is also essential in order to successfully carry out the barbecue process, to have a slow-burning fire, preferably of charcoal, with little or no flame, so that if greases from the meats drop into the fire, sudden flames will not result to burn or scorch the meats.

The principal object of my invention is to collect the gravy and drippings from the barbecuing meats, and at the same time, present no obstructions to the passage of the heat from the fire to the meats.

Another object is to prevent the grease from falling into the fire, resulting in flames that will burn and scorch the meat.

Another object is to provide a compact, efficient, portable barbecue device.

Other objects will be disclosed in the specification and claims forming a part hereof.

In the drawing:

Figure 1 is a portable section showing the drip receptacles in position;

Figure 2 is a section taken on line 2—2 of Figure 1;

Figure 3 is a detailed perspective of one of the drip receptacle baffles; and

Figure 4 is a front elevation showing the swinging door to the hearth.

Referring to the drawing, in which similar parts are designated with like numerals:

Numeral 4' designates a portable receptacle made of suitable material, comprising four walls, a front 5, sides 6, back 7, top 8, and a bottom 9. The top 8 is hingedly connected at 10, or may act as a lid and be removed by way of handle 11. A grill 12 extends across the entire upper portion of the receptacle to receive the meats to be cooked, or a revolving spit (not shown) may be substituted for the grill 12. Angle irons 13 support the grill 12. Beneath the grill 12 are arranged a series of baffles 14, substantially parallel to each other but in angular relation to the grill 12. The baffles 14 extend the entire width of the receptacle and are so arranged that the top portion of the rearmost baffle is directly beneath the rearmost portion of the grill 12 and extends away from said rear wall 15.

The remainder of the baffles are deflected from the vertical so that the upper end of one plate will overhang a runway or trough 16 which is formed at the bottom of each baffle, so that any juices or other liquids falling from the grill 12 above will fall either on the baffle plate and be directed into the trough 16, or will fall directly into the trough or runway. It is to be noted that this arrangement in no way interferes with the passage of heat from the hearth 17 at the bottom of the receptacle to the grill 12. The troughs 16 slope approximately ten degrees from the horizontal and extend through the side wall 6, emptying into a runway 18 which is likewise sloped and extends the length of the side 6 emptying into a collector pan (not shown).

Each baffle 14 is supported by studs 19 which extend from the sides of the baffles and extend through bearings 20 formed in the front and back walls 5 and 7, respectively. Lock nuts 21 cooperate with the studs 19 which are threaded to hold the baffles in position. The baffles which are supported by the studs 19 may be rotated so as to maintain their relative positions to each other, collecting all of the drippings, that is to say, that the top portion of the baffle will continue to overlap the adjacent trough, but will directly affect the passage of heat and the draft of the chimney 22. The more nearly the baffles assume the horizontal, the more completely will the passage of heat be curtailed and the draft of the chimney closed off.

A chimney 22 extends from the back wall 7 to provide a draft and dispose of the smoke. A swinging door 23 is arranged in the front opposite the firebox, and gives access thereto. The door 23 giving access to the firebox, permits refueling and proper care of the fire.

Insulating material such as asbestos 14', is placed on the underside of the baffles, troughs and runways so as to protect the juices and sauces from excessive heat while being caught and conveyed to the collecting pan. This feature I consider very valuable since the baffles being very close to the source of heat would become extremely hot and burn the juices and sauces before they could return to the collecting pan.

As actually used, the meats to be barbecued are placed on the grill 12, or on revolving spits, directly above the baffles 14. In order to properly barbecue meats, the cooking should preferably be done over a charcoal or oak fire, the cooking process being slow so that the meats will be given time to absorb the barbecue sauce and dressings applied as basting and the cooking meats must remain covered in order to prevent the charcoal or wood from becoming active. It is also essential that the sauces applied during cooking will have time to permeate and flavor the meat. Such sauces vary and will be applied at intervals in order to get the best flavor.

After the meats are placed over the baffles and start to cook, juices will exude from the meats, and, unless caught, will drop into the fire. This is doubly true after the sauces are applied to the meat, and, since many of these sauces are expensive, it is highly desirable that they be saved and reapplied during the period of cooking. By having the baffles arranged in parallel relation to each other and overlapping in the manner described, the juices and sauces will be caught in the troughs 16 and returned to a collecting pan where they can be again used.

Due to the insulation placed on the underside of the baffles, troughs, and runways, there is no danger of the sauces and juices being exposed to excessive heat and being burned. Furthermore, due to the arrangement of the baffles, an unobstructed passage is provided for the heat so that it comes directly into contact with the meats. Due to the simplicity of the construction, a portable barbecuing apparatus is provided which may be transported from one place to another, resulting in a great saving in time and labor. The general practice at the present time is to construct permanent barbecuing apparatus which becomes a total loss upon the owner changing his location.

Numerous variations may doubtless be devised by persons skilled in the art without departing from the principles of my invention. I, therefore, desire no limitations to be imposed on my invention, except such as are indicated in the appended claims.

What I claim is:

1. A barbecue apparatus comprising a cooking receptacle, means for supporting products to be cooked, a series of baffles arranged beneath said means substantially parallel to each other but in angular relation to the vertical, and having means at the bottom of said baffles and forming a part thereof for collecting the drippings from said barbecue product, the tops of said baffles being in alignment with the collecting means forming a part of an adjacent baffle.

2. A barbecue apparatus comprising a cooking receptacle, means for supporting products to be cooked, a series of baffles having troughs arranged beneath said means, said baffles extending substantially the width of said receptacle, the said baffles arranged substantially parallel to each other but in angular relation to the walls of said cooking receptacle, the innermost baffle having its top adjacent the rear wall and the remaining baffle tops overlying an adjacent trough and a runway connecting said troughs, said troughs tilted to deliver into said runway.

3. A barbecue apparatus comprising a cooking receptacle, means for supporting products to be cooked, a series of baffles having troughs forming a part of said baffles and positioned at the lower end thereof beneath said means, said baffles extending substantially the width of said receptacle, the said baffles arranged substantially parallel to each other but in angular relation to the walls of said cooking receptacle, the innermost baffle having its top adjacent the rear wall and the remaining baffle tops overlying an adjacent trough, a runway connecting said troughs, said troughs tilted to deliver into said runway, said baffles forming uninterrupted channels for the passage of heat.

4. A barbecue apparatus comprising a cooking receptacle having walls and a heating compartment, a smoke discharge exit in said compartment, means for supporting products to be cooked, a series of baffles pivotally mounted beneath said supporting means and comprising tilted plates having troughs formed at the lower ends thereof and forming a part of said baffles, said baffles extending substantially the width of said receptacle and arranged substantially parallel to each other but in angular relation to the vertical, the baffle tops arranged to overlie an adjacent trough so as to permit passage of heat, but to catch all drippings, and adapted to be adjusted to simultaneously control the passage of heat between said plates and draft of said exit.

MARTIN J. EBBERTS.